March 31, 1964     R. CHAPMAN     3,126,578
BOARD FORMING PRESS AND METHOD OF MAKING BOARD SUBSTITUTES
Original Filed June 7, 1957     10 Sheets-Sheet 1

INVENTOR.
Ralph Chapman
BY Buckhorn, Cheatham & Blore
ATTORNEYS

INVENTOR.
Ralph Chapman
BY
Buckhorn, Cheatham & Blore

ATTORNEYS

March 31, 1964 R. CHAPMAN 3,126,578
BOARD FORMING PRESS AND METHOD OF MAKING BOARD SUBSTITUTES
Original Filed June 7, 1957 10 Sheets-Sheet 3
FIG. 3
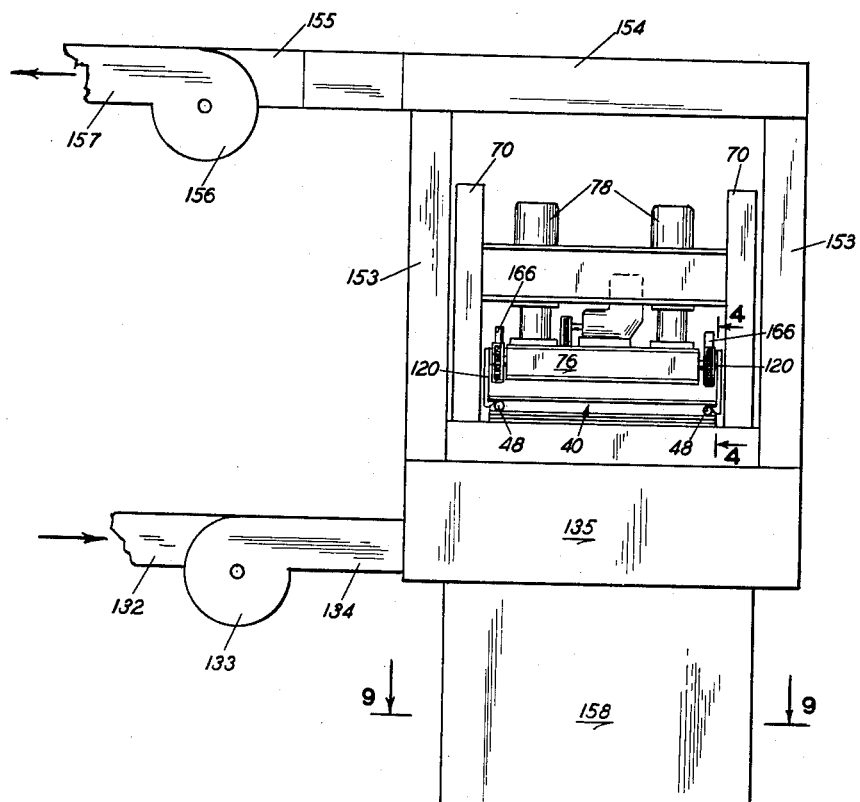
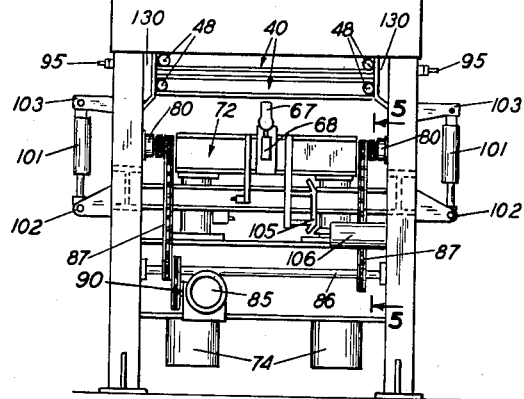
INVENTOR.
Ralph Chapman
BY
Buckhorn, Cheatham & Blore
ATTORNEYS INVENTOR.
Ralph Chapman
BY
Buckhorn, Cheatham & Blore

ATTORNEYS

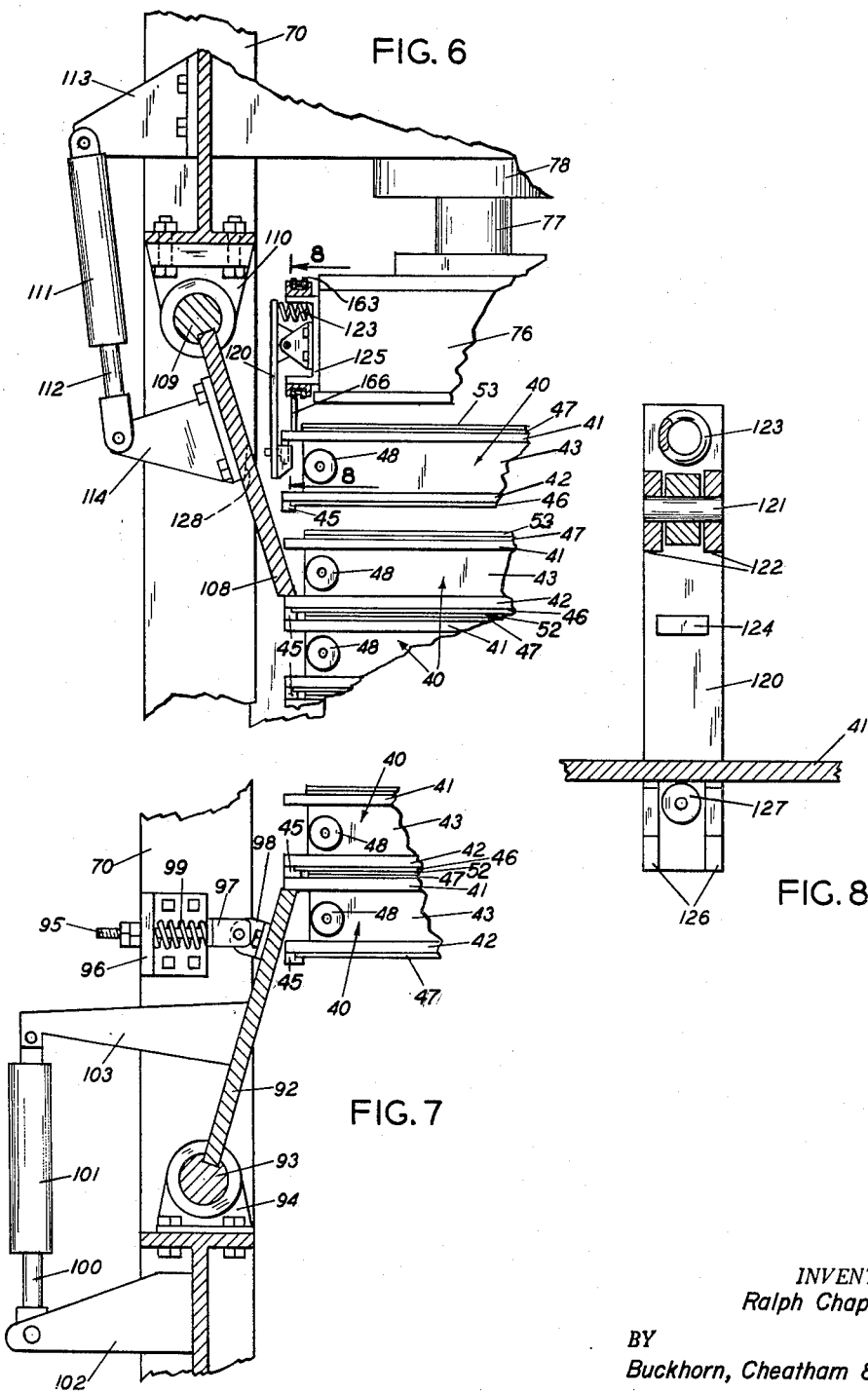

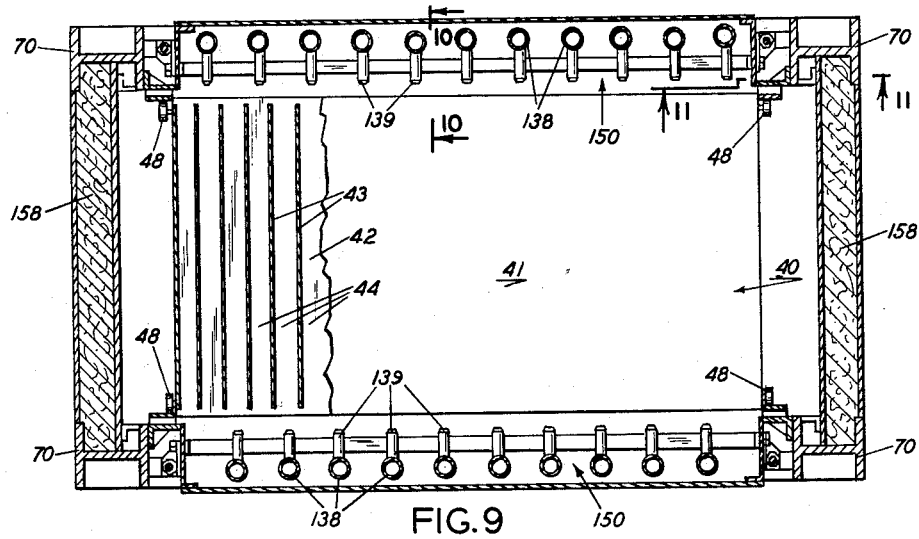
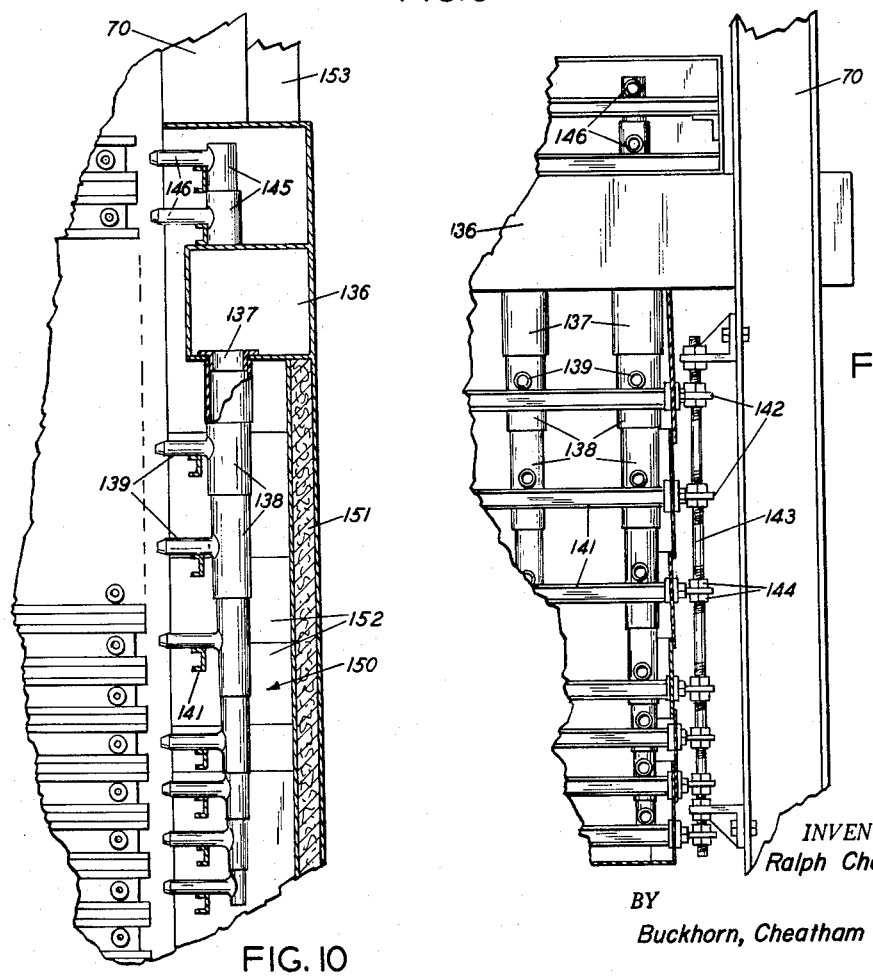

March 31, 1964   R. CHAPMAN   3,126,578
BOARD FORMING PRESS AND METHOD OF MAKING BOARD SUBSTITUTES
Original Filed June 7, 1957   10 Sheets-Sheet 7

INVENTOR.
Ralph Chapman
BY
Buckhorn, Cheatham & Blore
ATTORNEYS

March 31, 1964  R. CHAPMAN  3,126,578
BOARD FORMING PRESS AND METHOD OF MAKING BOARD SUBSTITUTES
Original Filed June 7, 1957  10 Sheets-Sheet 8
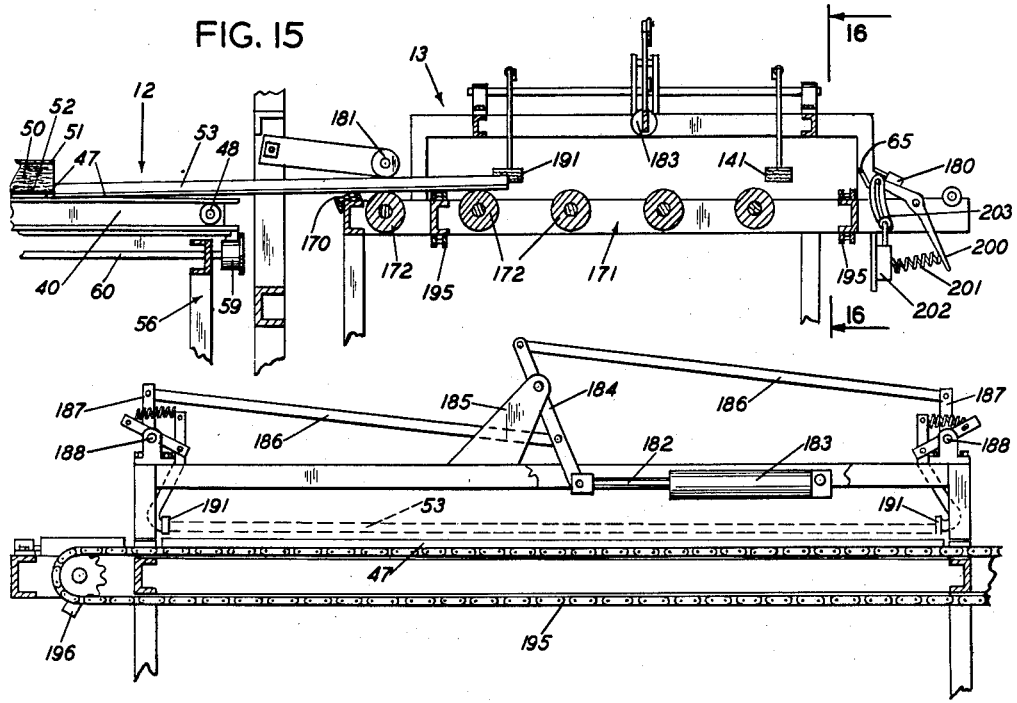
FIG. 15
FIG. 16
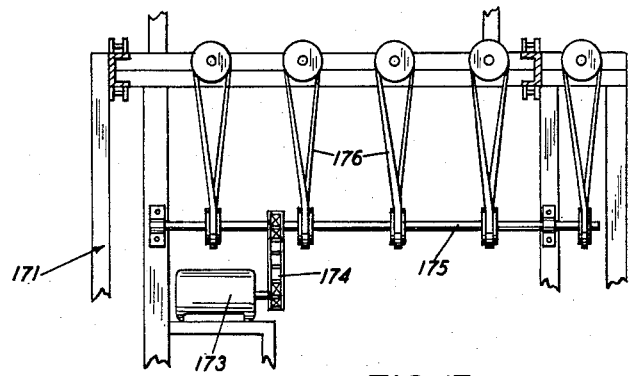
FIG. 17
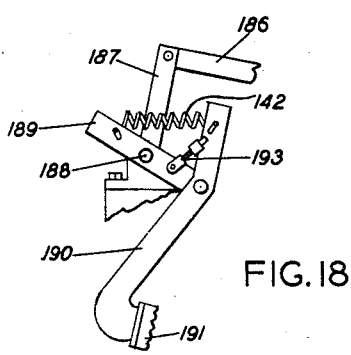
FIG. 18
INVENTOR.
Ralph Chapman
BY
Buckhorn, Cheatham & Blore
ATTORNEYS

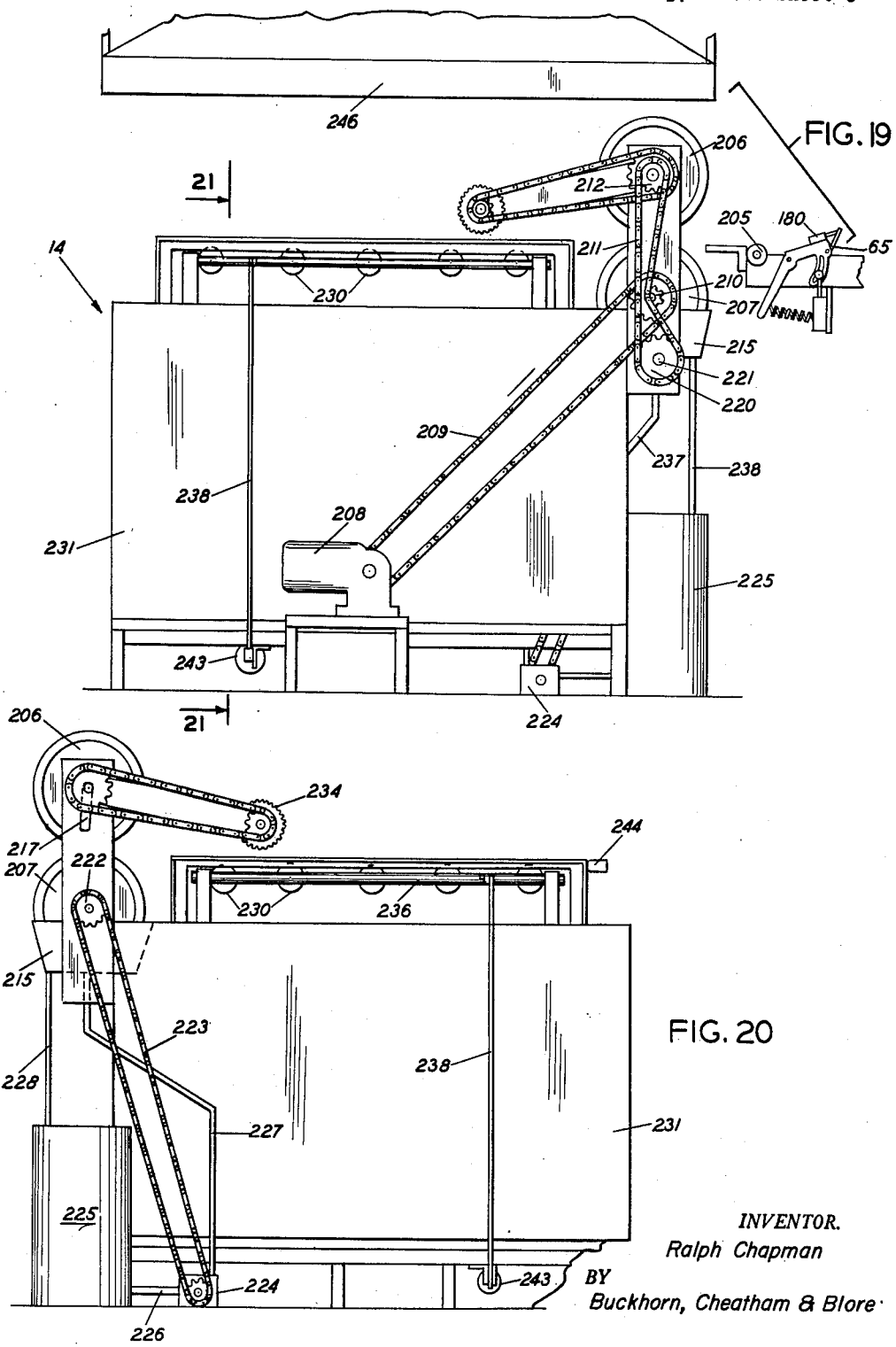

March 31, 1964  R. CHAPMAN  3,126,578
BOARD FORMING PRESS AND METHOD OF MAKING BOARD SUBSTITUTES
Original Filed June 7, 1957  10 Sheets-Sheet 10

INVENTOR.
Ralph Chapman
BY
Buckhorn, Cheatham & Blore
ATTORNEYS

United States Patent Office 3,126,578
Patented Mar. 31, 1964

3,126,578
BOARD FORMING PRESS AND METHOD OF MAKING BOARD SUBSTITUTES
Ralph Chapman, Corvallis, Oreg., assignor to Wood Processes (Oregon) Ltd., Corvallis, Oreg., a limited partnership of Oregon
Continuation of application Ser. No. 664,314, June 7, 1957. This application Aug. 1, 1960, Ser. No. 46,554
11 Claims. (Cl. 18—4)

This application is a continuation of my co-pending application Serial No. 664,314, filed June 7, 1957, now abandoned, which in turn is a continuation-in-part of my abandoned application Serial No. 487,753, filed February 14, 1955.

The object of the present invention is to provide a press, and a method of manufacturing, for the manufacture of artificial board substitutes, particularly those formed in large panels such as in the size of four feet by eight feet. It is to be appreciated, of course, that the press could be made larger or smaller for manufacturing larger or smaller boards.

A principal object of the present invention is to provide a means and method whereby artificial boards may be consolidated in a continuous process, as distinguished from the batch-forming process commonly encountered in the industry. In the prior art board substitutes, such as plywood, hardboard, medium density board, insulating panels and the like, are formed from pre-formed mats, a plurality of which are accumulated until a previous batch of boards has been consolidated in a hot-press. The usual form of hot-press comprises a plurality of platens which remain in a frame and are relatively movable with respect to each other to a limited extent so that the platens may be separated to permit the withdrawal of finished boards and the insertion of unconsolidated mats from an accumulator. Depending upon the number of platens, the boards may be consolidated in batches of ten, fifteen, twenty and so on. A disadvantage of presses of this character is that they are designed to consolidate materials to high densities, often exerting pressures as high as one thousand to fifteen hundred p.s.i. Also, such presses have the ability to deliver great amounts of heat, the platens being hollow and conveying live steam therethrough. For this reason the platens are of very heavy construction, being required to withstand internal steam pressures as high as five hundred to six hundred p.s.i. The cost of constructiong the platens, the frame to hold them, and the means to operate them is great, and in addition a steam plant capable of converting furnace heat to steam is required and is likewise very costly.

A further disadvantage of the conventional steam-heated, multiple opening press is that a board between the lowermost pair of platens is subjected to considerably greater pressure than a board between the uppermost pair of platens, and intervening boards are subject to proportionate pressures from the bottom to the top, because of the great weight of the platens supported by each board. Even though stops are interposed between platens to control the board thickness, the structure of the product created is affected because the rate of closure and the pressure exerted during closure determine whether the board has a high density near the surface or toward the interior. It is, naturally, desirable that artificial board be dense near the surface and less dense in the center, and this can be controlled by controlling the rate of closure of the platens upon the board. However, the optimum pressure can be applied to only one board in a multiple opening press, the remainder of the boards being less perfectly formed than this one board. It is also difficult in multiple opening presses to maintain a uniform temperature from the top of the press to the bottom of the press, a factor which affects the uniformity of the finished product. The effect of variable temperatures is so great that many operators have gone to great lengths to add control systems and devices in an attempt to control the temperature of each platen separately. A further drawback of multiple opening presses is that the number of platens which it is practical to use in a multiple opening press is limited, and as a result the entire production of a plant is limited unless more than one press be used. And, since it is impractical to convey board-forming mats from one unit of forming equipment to two presses, which must be located at different locations, the full capacity of the forming equipment is usually never utilized.

One of the principal objects of my present invention is to provide a press which is much lower in cost than the conventional type and which requires no expensive, auxiliary equipment such as accumulating loaders, accumulating unloaders, steam plants, platens designed to withstand high internal pressures, temperature uniformity control systems and mechanisms, and the like. The press of my invention subjects every board to the optimum closing speed and closing temperature, and it also subjects every board to exactly the same temperatures and pressures for exactly the same periods of time so that an exactly uniform product is produced, every board having been subjected to the same conditions and treatment.

The press of the present invention may be designed to accommodate any number of platens, there being practically no limit to the number of platens that can be used in one press frame. The press of the present invention is constructed at a great saving over the cost of conventional, multiple opening presses, since there are only two daylight openings to be provided, one at the bottom of the press and one at the top of the press, for the entire complement of platens, instead of providing means for daylight openings at each platen in the press.

A further object of the present invention is to provide means whereby the one piece of apparatus serves both as a hot press and as a heat-treating oven for artificial board manufacture. In conventional practice, after a board is removed from the hot press it is in a relatively unstable condition, having been subjected to high pressures and heat for a short period of time. Many artificial boards have percentages of some thermo-setting or heat curable adhesive added thereto. Other artificial boards depend upon the natural adhesive substances of the wood from which the board is made to bind the fibres together. In either case, it is the application of heat and pressure which in some fashion or other sets the adhesive so as to hold the fibres together. When a mat of fibres is subjected to high temperatures and pressures for a period of, for example, three minutes in the ordinary hot press, most of the heat is applied to driving the moisture out of the material in the form of steam, and it is only for a small fraction of the final period of time that the press remains engaged that the heat is directed to curing or setting the natural and any added adhesives. Depending upon the heat and pressure applied, the curing effect may or may not be complete, or may or may not reach entirely through the board. For this reason many artificial boards are placed in a heat-treating oven for a long period of time in an attempt to achieve final setting of the adhesive substances throughout the board. This may or may not be effective, depending upon the adhesives employed, the length of time and the amount of heat applied, and other factors, but in any event it is a poor compromise, since the board is no longer being retained under pressure. A further disadvantage is that the heat-treating oven must be very large to handle the output of the plant for a period of many hours, thus requiring expensive equipment, a further supply of heat, other means to move heated air or apply heat to the heating oven, and the use of expensive floor space. The press of my invention eliminates the heat-treating oven and applies curing heat to the board immediately following the initial application of heat and pressure when the curing heat will do the most good, each board being treated uniformly and while retained under pressure. A board produced in my press, utilizing an inexpensive protein adhesive, is cured to such an extent that it may be used as the weather surfacing of buildings without appreciable swelling or deterioration in the exposed position. A board produced in a press of this character, utilizing equivalent amounts of thermosetting adhesive, such as a phenol formaldehyde resin, is superior in moisture resistance and other qualities to a board produced in a conventional press, no matter how well the conventional board is oven-treated afterwards. A board produced in my press does not require oil tempering in order to serve as well as most conventionally produced, oil tempered boards. The press is especially designed to allow for a long period of curing time, not only to enable the curing of inexpensive protein adhesives but also to enable heat treatment for a sufficient period of time to render the adhesive materials water-insoluble.

A further object of the present invention is to provide a method of fabricating board substitutes in which a perfectly cured board product having superior characteristics may be formed.

The objects and advantages of the present invention will be more readily ascertained from an inspection of the accompanying drawings taken in connection with the following specification wherein like numerals refer to like parts throughout.

In the drawings,

FIG. 3 is an end elevation of the press taken from the plane 3—3 of FIG. 1;

FIG. 6 is a partial vertical section, on an enlarged scale, taken substantially from the plane 6—6 of FIG. 2;

FIG. 7 is a partial vertical section, on an enlarged scale, taken substantially from the plane 7—7 of FIG. 2;

FIG. 8 is a partial vertical section, on an enlarged scale, taken substantially from the plane 8—8 of FIG. 6;

FIG. 9 is a horizontal section, on an enalrged scale, taken substantially along line 9—9 of FIG. 3;

FIG. 10 is a partial vertical section, on an enlarged scale, taken substantially along line 10—10 of FIG. 9;

FIG. 11 is a partial vertical section, on an enlarged scale, taken substantially along line 11—11 of FIG. 9;

FIG. 15 is a partial vertical section, on an enlarged scale, taken substantially from the plane 15—15 of FIG. 1;

FIG. 16 is a vertical section taken substantially along the line 16—16 of FIG. 15;

FIG. 17 is a partial vertical section taken substantially along line 17—17 of FIG. 1;

FIG. 18 is an enlarged, detailed view of a portion of the apparatus illustrated in FIGS. 15 and 16;

FIG. 19 is an end elevation of a tempering and stacking mechanism to which the consolidated boards are delivered, the view being taken from the plane 19—19 of FIG. 1 in which only a portion of said apparatus appears;

FIG. 20 is an elevational view of the opposite side of the apparatus illustrated in FIG. 19;

The hot press of the present invention may be utilized for consolidating any board-making constituents capable of being consolidated under heat and pressure, such as veneer sheets laminated together with thermo-setting adhesive to form plywood, wood fibres with or without added thermo-setting adhesives and capable of being consolidated into insulating board, medium-density board or hardboard, chips, sawdust, flakes, shavings and the like with or without thermo-setting adhesives to form particle board, shaving board, chip board or the like; in fact, any suitable materials capable of being consolidated under heat and pressure into an artificial board or board substitute.

Figure 1:
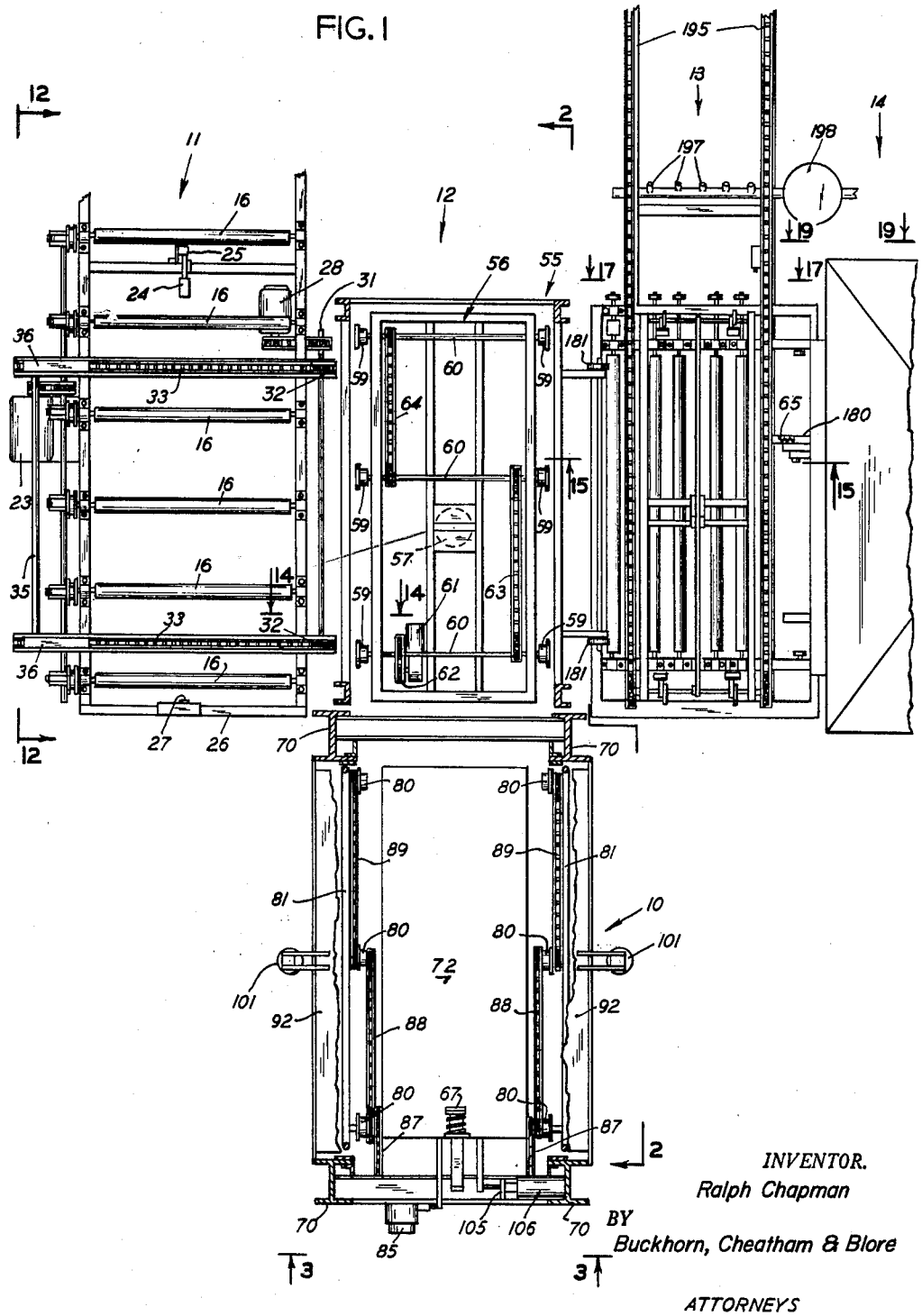
FIG. 1 is a view mostly in plan, and partially in section, taken along line 1—1 of FIG. 2, showing the press, the means for introducing fresh mats thereto, and the means for taking consolidated board therefrom.

Referring to FIG. 1, the press of the present invention is designated in general by the numeral 10. Mats of unconsolidated material are formed in suitable means (not herein illustrated) and are fed toward the press by incoming transporter means indicated generally at 11. The incoming transporter means comprises an elongated conveyor adapted to transport separate caul-plates, preferably aluminum alloy plates about one-quarter of an inch in thickness. When a caul-plate supporting the material reaches the end of the conveyor, means automatically transfers the caul-plate onto an elevator illustrated generally at 12, when the elevator is in its lowered position. After the caul-plate has been placed on the elevator mechanism, it is automatically moved into the bottom of the press 10. When the elevator is in its elevated position a finished board, a caul-plate and a separate platen are removed from the top of the press onto the elevator and lowered to the level of the bottom of the stack. The incoming caul-plate pushes the caul-plate bearing a consolidated board off the platen, which remains on the elevator, the board and its caul-plate being moved laterally into an outgoing transporter indicated generally at 13. In this fashion a hot platen receives the fresh material and immediately starts to heat it, the hot platen being rapidly returned to the bottom of the press before it has lost much heat. In the outgoing transporter means are provided to lift the finished board from the surface of the caul-plate, whereupon an outgoing conveyor automatically moves the caul-plate from beneath the finished board so that the caul-plate may be circulated back to the means for forming the mats of material. The finished board is then moved farther in the lateral direction into tempering and stacking mechanism indicated generally at 14. The tempering mechanism is utilized only when tempered board is desired, and the same mechanism may be used to apply other types of finishes to the board while still in a hot condition, or those boards which are to be utilized in their natural state may be stacked without treatment at this stage. From the foregoing it will be realized that the mechanism comprises a plurality of separate platens, there being one platen more than the number which is maintained under pressure in the press. The extra platen is removed from the top of the stack, lowered to the bottom, and returned to the bottom of the stack in rapid order, thereby conserving heat and resulting in uniform treatment of both surfaces of the mat as will be explained. Also, there are a plurality of separate caul-plates, there being approximately five more than the number maintained under pressure in the stack at any time, the excess caul-plates being circulated through the mat-forming mechanism by means not herein illustrated beyond indicating the ends of the incoming and outgoing transporters.

The Incoming Transporter

Figure 12:
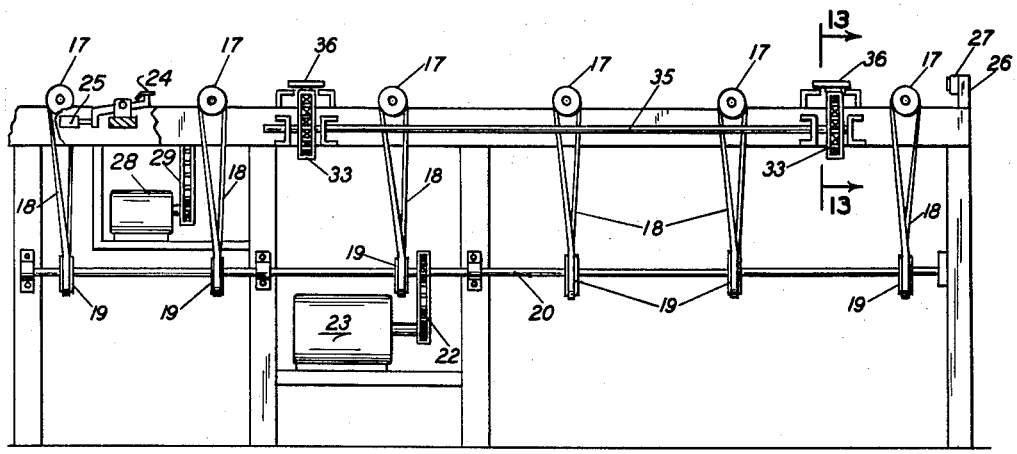
FIG. 12 is an end elevation of a portion of the apparatus for feeding unconsolidated mats to the press, taken substantially from the plane 12—12 of FIG. 1.

The incoming transporter 11 comprises an elevated frame upon which are mounted a plurality of live rolls 16 which advance the caul-plates and the material thereon longitudinally of the frame. The live rolls are driven by pulleys 17 (see FIG. 12), belts 18 and driver pulleys 19, the latter pulleys being fixed to a longitudinal drive-shaft 20 which is in turn driven by a sprocket chain drive 22 and an electric motor 23. While the caul-plate is being so advanced, it holds a switch actuator 24 depressed, the actuator closing a switch 25 which causes operation of the motor 23. The trailing edge of the caul-plate releases the switch actuator to stop the motor shortly before the leading edge reaches a stop-bar 26 extending across the end of the frame; however, the inertia of the caul-plate and material carries this caul-plate forward until it closes a switch 27 mounted on the bar 26. The switch 27 when closed starts a second electric motor 28 which is connected by a sprocket drive 29 to a shaft 31 extending longitudinally of the opposite side of the frame and having a pair of drive sprockets 32 mounted thereon adjacent its opposite ends. The sprockets 32 drive a pair of transverse conveyor chains 33 (FIGS. 1 and 3), the upper reaches of which are slightly below the level of the tops of the rolls 16, the sprocket chains 33 extending about a pair of idler sprockets 34 mounted on the opposite side of the frame on a common shaft 35.

Figure 13:
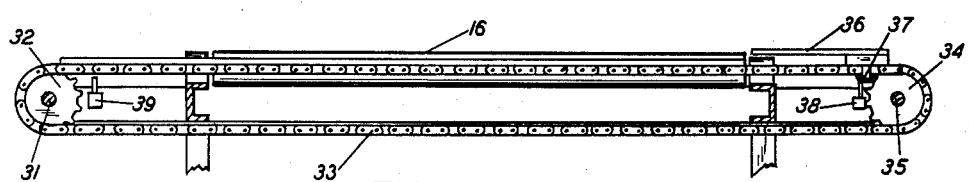
FIG. 13 is a partial vertical section taken substantially from the plane 13—13 of FIG. 12.

A pusher plate 36 is connected to the upper reach of each of the chains 33, being normally retained at one side out of the path of the caul-plate being advanced by the live rolls 16, as illustrated in FIG. 13. The pusher plates are attached at one end only so that they may project forwardly beyond the sprockets 32 when they have been advanced to the position illustrated in FIG. 14. A switch actuator 37 is mounted beneath one of the pusher plates 36 and normally holds a switch 38 in open position. Switches 27 and 38 are connected in parallel so that when the edge of the caul-plate has been advanced beyond the switch 27 the motor 28 will nevertheless continue to operate since the switch 38 has been released to close a circuit to the motor. When the actuator 37 reaches the opposite side of the frame, it actuates a reversing switch 39 which reverses motor 30 to return the pusher plates 36 to their normal positions.

The Platens and Elevator

Figure 14:
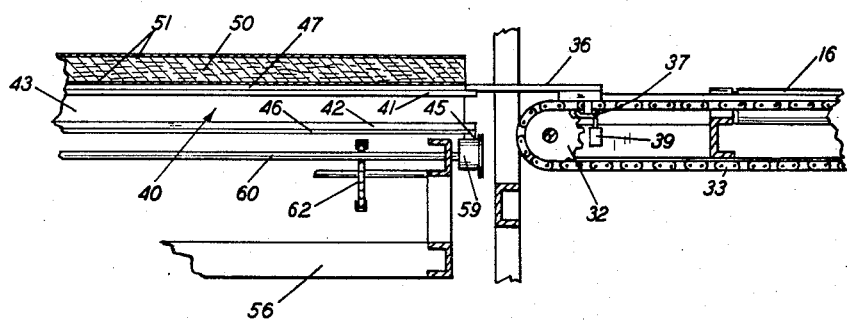
FIG. 14 is a partial vertical section taken substantially along the line 14—14 of FIG. 1.

Each of the separate platens comprises a welded assembly of steel plates, there being an upper plate 41, a lower plate 42, and a plurality of transverse, vertical ribs 43 dividing the interior of the platen into a plurality of parallel open-ended passages 44 extending from side to side of the platen (FIGS. 9 and 14). The plates 41 and 42 extend beyond the ribs 43 for a purpose to be explained later. A replaceable jib, or spacer strip, 45 extends longitudinally of each longitudinal edge of the platen, depending from the lower plate 42. The vertical thickness of the jibs, or spacer strips, determines the final thickness, and hence the density, of the consolidated board. As seen in FIG. 14 each jib clamps the edge of an aluminum alloy caul-plate 46, thus providing a smooth surface on the bottom of each platen comparable to the separate caul-plate 47 upon which the material is positioned in the forming machine. Each platen carries a pair of guide rollers 48 at each end for a purpose to be explained.

FIG. 14 illustrates the position on a caul-plate of a core of loosely inter-leaved wood flakes 50 sandwiched between moist felts 51 of fibre. The sandwich of a core between moist felts is representative of any unconsolidated mat 52 of board-making constituents capable of being consolidated under heat and pressure. As seen in FIG. 15, the caul-plate 47 which is being advanced by the pusher plates 36 pushes the caul-plate 47 bearing a consolidated board 53 off the elevator mechanism and into the outgoing transporter 13. The movement of the pusher plates is such that the new caul-plate is centered on the hot platen resting in the elevator mechanism, with its edges spaced slightly inwardly from the edges of the platen.

The elevator mechanism 12 comprises an upright frame, generally indicated at 55, which is longitudinally aligned with the press 10 and extends upwardly alongside of the press to a point near the top thereof. An elevator deck 56 composed of rigid structural members welded together to form a rectangular framework is reciprocated vertically within the frame 55 by means of an elongated, hydraulic piston 57 and cylinder 58, the cylinder being sunk deeply into the ground beneath the floor level. Pairs of flanged rollers 59 are fixed to the ends of three transverse driving shafts 60 mounted in the deck 56. A reversible, electric motor 61 mounted in the deck drives the rollers 59 in either direction through sprocket chain driving means indicated at 62, 63 and 64. The jibs 45 depending from a platen 40 rest upon the rollers 59, and the platen is thereby moved longitudinally in either direction when the motor 61 is energized. It is to be appreciated that interlocking control circuits (not illustrated) are provided, whereby the motor 61 cannot be energized until the pusher plates 36 have returned and switch 38 is closed, and the platen bearing a finished board has completely left the elevator mechanism and engaged a switch actuator 65 (FIG. 15), thereby indicating the presence of a fresh mat to be consolidated and the clearance of the consolidated board from the elevator mechanism. Likewise, a control switch 66 (FIG. 5) is included in the interlocking circuits, said switch being mounted upon the frame 55 in position to be engaged by the elevator deck 56 when it reaches its lowermost position, thereby preventing actuation of the pusher plates 33 until the elevator is in position to receive the incoming caul-plate. Switch 66 is also included in the circuit to the motor 61 so that the motor cannot be actuated until switch 66 is closed, and will then only be actuated in a direction to advance the platen into the press 10. Stopping of the motor 61 is effected when the leading end of the platen engages a spring-loaded bumper 67 at the far end of the press 10, which bumper also actuates a switch 68 tied into the control circuit for motor 61 (FIGS. 1 and 3). Closing of switch 68 prepares a lower hydraulic ram, to be described, for subsequent actuation and causes actuation of the hydraulic piston 57 to elevate the elevator deck 56 to the top of the stack at the position illustrated in FIG. 4.

The Press

The press comprises an upright frame, the vertical corners of which comprise heavy H-beams indicated at 70. The H-beams 70 are connected together by heavy, lateral and longitudinal braces, as illustrated, and the upper extremities thereof are prevented from swaying by suitable buttresses and external frame-work (not shown). The rectangular space between the H-beams 70 is open for the most part, from the level to which the elevator deck 56 is lowered to the level to which the elevator deck 56 is raised. The height of the press may vary within wide limits, depending in part upon the nature of the product being consolidated and in part upon the speed of operation of related equipment, such as the means for forming mats of unconsolidated material. A height sufficient to accommodate from twenty to thirty superimposed platens 40 will suffice for most operations.

A lower, hydraulic ram is mounted within the press at the bottom thereof, the ram comprising a horizontally disposed ram deck 72 actuated by a plurality of ram pistons 73 extending vertically upward from ram cylinders 74, all of the pistons and cylinders being interconnected for operation in unison. An upper, hydraulic ram is suitably mounted at the top of the press frame, the same comprising a downwardly facing ram deck 76 connected to a plurality of depending pistons 77 operating in hydraulic cylinders 78, all of the pistons and cylinders being connected together for unitary operation. The stack of platens 40 with material sandwiched therebetween within the press is at times under compression between the lower ram and an upper abutment means (to be described), at times under compression between the upper and lower hydraulic rams, and at times under compression between the upper hydraulic ram and lower abutment means (to be described). It is, of course, apparent that the lowermost platen and material thereon in the stack is always subjected to the weight of the entire stack, and each successive platen in an upward direction bears the remainder of the weight of the stack.

The incoming platen bearing an unconsolidated mat of material is receiver on a plurality of driven, flanged rollers 80 which are fixed to short shafts journaled on a pair of longitudinally extending bars 81 mounted at the sides of the frame. The ends of the bars 81 are fixed to vertical guide sleeves 82 (FIG. 5) which slide on vertical guide bars 83 mounted on the press frame. Vertical springs 84 normally maintain the bars 81 at an upper limit position determined by adjustable stops on the guide bars 83, but should the lower abutment means fail to function and thereby allow the weight of the entire stack to exert pressure on the flanged rollers 80, these springs 84 allow the entire assembly to move downward and cause the weight of the stack of platens to be supported by the lower platen, thereby saving many parts of the assembly from destruction.

The rollers 80 are driven in the same direction and at the same time as rollers 59, being under control of the same set of switches. The motor for driving the rollers is indicated at 85. The motor 85 is mounted on the press frame and drives a transverse sprocket-shaft 86 through a sprocket drive indicated at 90. A pair of driven sprockets on shaft 86 respectively drive a pair of sprocket chain drive means 87 extending upwardly at opposite sides of the press to the shaft of the first laterally disposed pair of rollers 80. All of the rollers 80 are inter-connected for unitary motion by other sprocket drives indicated at 88 and 89, respectively. It will be observed, particularly in FIG. 1, that the space between the sprocket driving means and the rollers 80 is open so that the lower ram deck 72 may pass above the level of the rollers 80. When the platen is being introduced to the press, the ram deck 72 is lowered to the position illustrated in FIG. 5 so as not to obstruct the introduction of the platen.

Figure 2:
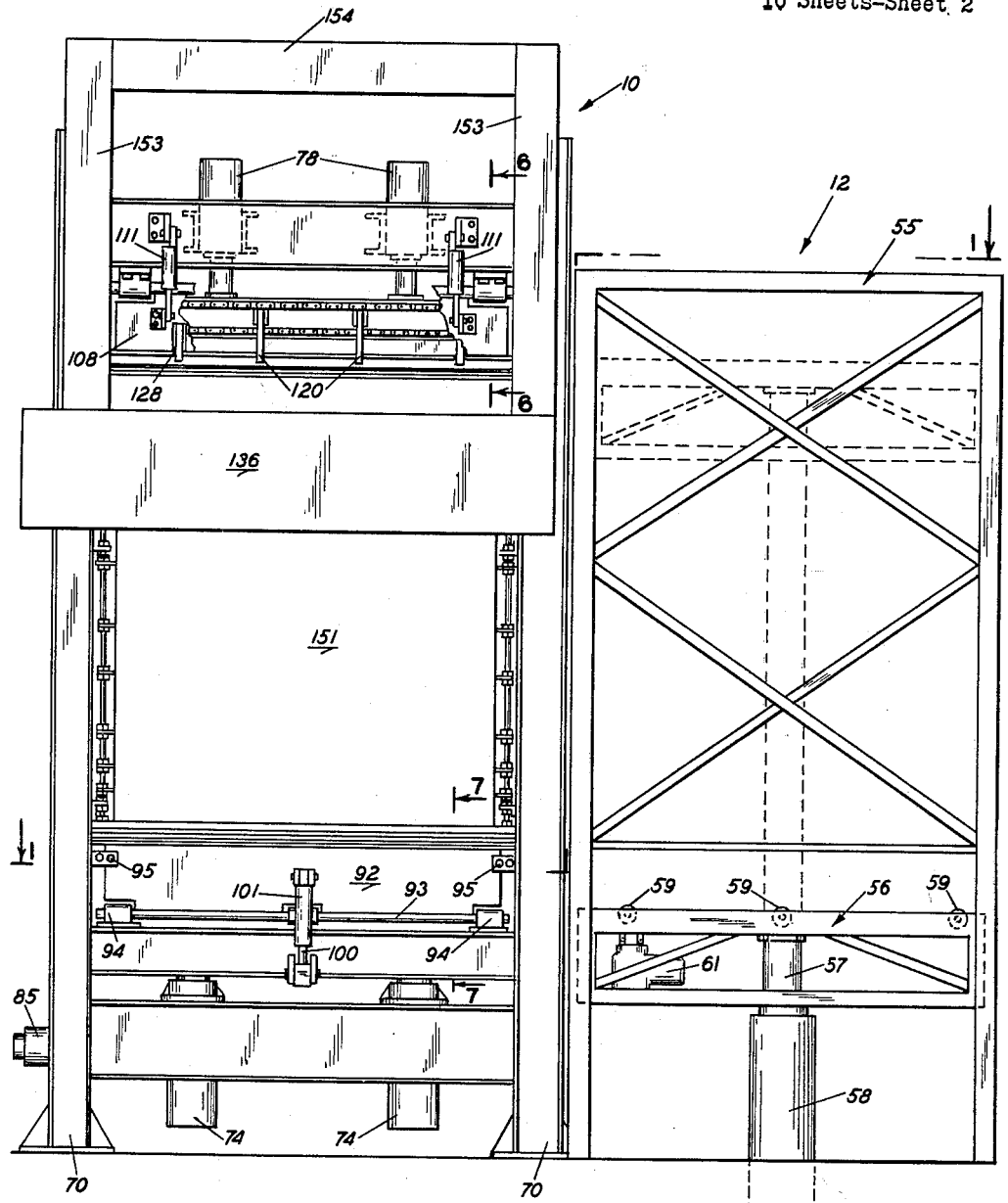
FIG. 2 is a view in side elevation of the press and its associated elevator, taken substantially from the line 2—2 of FIG. 1.

While the platen bearing a mat of unconsolidated materials is being introduced to the press, the stack of platens 40 in the press is supported by the lower abutment means most clearly illustrated in FIGS. 2 and 7. The abutment means comprise a pair of lower abutment plates 92 extending longitudinally at opposite sides of the frame. The lower horizontal edge of each plate 92 is mounted in a slot in the upper surface of a rocker shaft 93 of great strength, which shaft is journaled in bearings 94 adjacent the H-beams 70. The upper horizontal edge of each plate 92 is beveled to fit into the angle between the overhanging edge of the upper plate 41 and the vertical ribs 43 of the lowermost platen 40 in the stack, when the plate 92 is swung inwardly as illustrated in FIG. 7. A pair of adjustable limting rods 95 are mounted adjacent the upper corners of the plate 92. The rods are slidably mounted in brackets 96 mounted in the frame and terminate inwardly in clevises 97 which are pivotally connected to ears 98 on the plate. A spring 99 encircling the rod between the bracket 96 and clevis 97 constantly urges the plate inwardly, the springs acting as mechanical safety means assuring inward motion of the plates 92 in the event of failure of the hydraulic piston 100 and cylinder 101 which normally control the position of the plate. The piston 100 is pivotally connected to a fixed bracket 102 mounted on the frame and the upper end of the cylinder 101 is pivotally connected to an arm 103 fixed to the plate 92. The piston and cylinder are double-acting so that the plate may be positively pulled away from engagement with the platen, and positively moved into the holding position illustrated in FIG. 7. The plates 92 engage the opposite sides of the lowermost platen 40 in the stack at all times when the lower ram deck 72 is lowered, and the plates 92 are removed from such engagement only when the lower ram is extended and supporting the weight of the stack.

At the time when the platen with the unconsolidated mat of material is being introduced to the press, the plates 92 are holding the stack in elevated position and the lower ram deck 72 is retracted to such an extent that a switch actuator 105 mounted thereon (see FIGS. 1 and 3) is holding an adjustable timer switch mechanism 106 in a certain position to prevent fluid from entering the cylinders 74. The switch 68 is inter-connected with the switch mechanism 106 so that when the platen is fully introduced fluid is admitted to the cylinder 74 at a pressure calculated merely to raise the introduced platen until the material thereon engages the lower surface of the lowest platen in the stack and to maintain the same in contact therewith at a low pressure, in the order of one or two pounds per square inch, for a short period of time, in the order of one to three minutes. This may not be necessary with some materials, but is particularly desirable in connection with those materials having considerable moisture therein, such as in the case of wet fibre mats 51. The lower fibre mat, which tends to have more moisture at its lower surface, has been resting for a short period of time on the previously heated platen. At about the time the lower ram starts to elevate the material, the lower external surface of the material has been somewhat heated and dried to about equal the normal condition of the upper surface of the upper layer of material. When the upper surface is lightly pressed against the bottom of the stack and held there for a short period of time, both surfaces will be increasingly heated and dried inwardly toward the center of the mat of material. This has the effect of drying the surfaces and driving the moisture inwardly in the form of steam. This condition is permitted to continue, depending upon the setting of the controller switch 106, for such a period of time as to prevent the extrusion or squeezing out of moisture to the surfaces in the form of drops of water, thereby preventing blotching of the surfaces of the product.

It will be observed from a study of FIG. 3 that the controller actuator 105 has released the switch 106 prior to initial compression, as previously described. Release of the controller switch 106 starts a timer (not shown), which may be variably set, so as to cause the introduction of fluid into the cylinders 74 at a materially increased pressure, in the order of forty to fifty-five pounds per square inch, at the termination of the initial pressing period. This has the effect of compressing the mats of material on the next few platens to such an extent that the lower platen is lifted from engagement with the upper edge of the plates 92, at which period the switch controller 106 actuates the cylinders 101 to withdraw the plates 92.

As previously stated, the foregoing initial light pressing is not necessary with some materials, in which event the timer switch is eliminated and the initial light pressing period is not observed. In this event the full pressure of forty to fifty-five pounds per square inch is immediately applied to the cylinders 74. The application of such pressure compresses the lowermost mat and any overlying mats which have not been fully compressed, so that the stack is lifted from the upper edge of the plates 92 which may thereupon be withdrawn.

At this point the stack is held under compression between the lower ram and the upper abutment plates 108 detailed in FIG. 6. Each of the upper abutment plates 108 is mounted in a downwardly facing slot in a rigid shaft 109 mounted at the top of the frame in bearings 110. The plate may be rocked by means of a cylinder 111 and a piston 112 respectively pivoted to a bracket 113 and an arm 114 attached to the plate. Thus, the mechanism is substantially the reverse of the lower abutment plate mechanism, but in this instance there is no spring since the plate may fall open in the event of failure of the piston. The lower horizontal edge of each plate is beveled to enter the angle between the lower plate 42 and ribs 43 of the uppermost platen in the stack. The double-acting piston operates the plates 108 in timed sequence under the control of the controller switch 106, as follows:

When high-pressure fluid is admitted to the lower ram and the stack compressed against the inwardly swung upper abutment plates 108, the upper ram is retracted, as illustrated in FIG. 6. Immediately following the exertion of heavy pressure, fluid is admitted under pressure to the cylinders 78 at a higher pressure than the fluid admitted to the cylinders of the lower ram, whereby the upper ram 76 is lowered against the top of the stack and moves the entire stack downwardly a short distance against the resistance of the lower ram. This clears the upper abutment plates 108 from engagement with the top of the stack, whereupon the cylinders 111 are actuated to withdraw the plates 108.

While moving downwardly the upper ram is hooked onto the uppermost platen as illustrated in FIG. 6, the engagement means comprising a plurality of pivoted lifter arms 120 mounted along the opposite sides of the upper ram deck 76 and depending below the deck. Each lifter arm 120 is respectively mounted on a pivot 121 (see FIG. 8) between ears 122 fixed to the side of the deck. The upper end of the arm is pushed outwardly by a spring 123 which normally holds the arm in vertical position as limited by a block 124 on the arm engaging the lower flange of a channel bar 125 mounted on the side of the ram deck. A pair of upwardly and inwardly inclined wedges 126 mounted at the lower end of the arm engage the upper plate 41 of the top platen to spread the arms until they may snap beneath the over-hanging edges of the plate 41. An idler roll 127 projects slightly above the upper edges of the wedges 126 in position to engage the over-hanging edge of the plate 41 whereby the platen carrying a caul-plate and consolidated board may be lifted from the top of the stack when the upper ram is retracted. Each of the arms 120 is aligned with a slot 128 in the abutment plate 108, permitting reciprocal movement of the arms even though the plate 108 remains in engagement with the platen.

As soon as the upper abutment plates 108 are swung to the sides, the pressure differential between the upper and lower rams is reversed whereby the lower ram raises the entire stack against the lesser resistance of the downwardly thrusting upper ram. During the upward movement of the stack the cylinder 11 is actuated in the opposite direction to swing the upper abutment plates into engagement with the next lower platen, which stops the stack under pressure, but permits the upper ram to continue lifting the released platen carrying the consolidated board 53. Subsequently, the entire cycle of operations is repeated whereby each time a platen with an unconsolidated mat is added to the bottom of the stack, a platen carrying a consolidated board is lifted from the top of the stack, while the stack is maintained at all times under pressure in the order of forty to fifty-five pounds per square inch.

It is to be appreciated that in the formation of many board substitutes, such as those formed of wood flakes as previously described, the material between the lower few platens will resist the relatively low pressure until the steam generated by the penetrating heat softens the lignins binding the fibres together, which permits the material to slump into a compact, intermediate product of the thickness determined by the depth of the jibs 45. Thereafter, and as long as the platen remains in the stack, the material is subjected to drying and curing heat, steam being driven out through the pores and fine interstices between the flakes, and any thermo-setting or heat-curing, adhesive material being set whereby the final product is achieved. Those board substitutes comprising sandwiches, as previously described, have the fibre mats on the outer surfaces compacted into dense, smooth, paper skins firmly adhered to the rough surfaces of the consolidated core.

Figure 4:
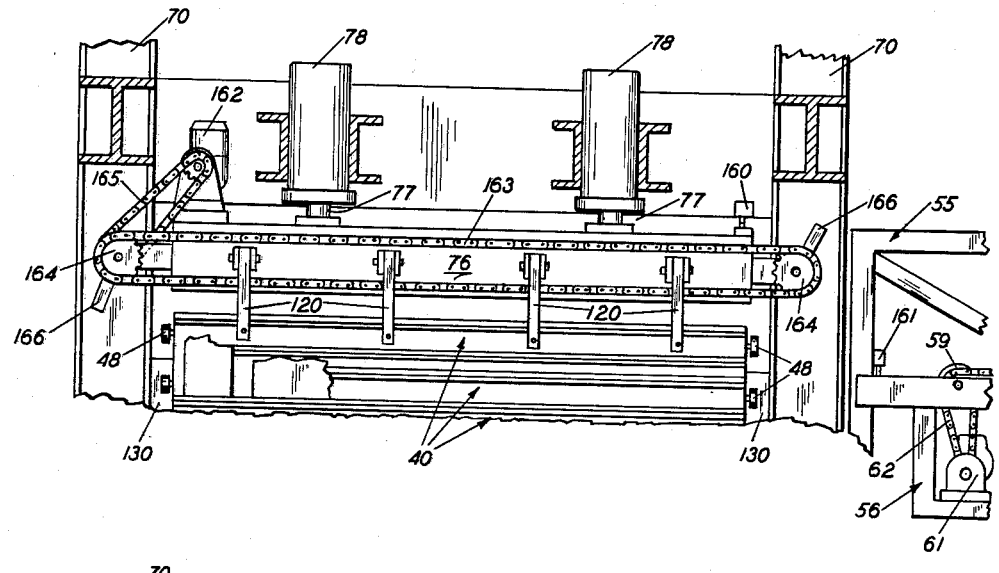
FIG. 4 is a partial vertical section, on an enlarged scale, taken substantially from the plane 4—4 of FIG. 3.
Figure 5:
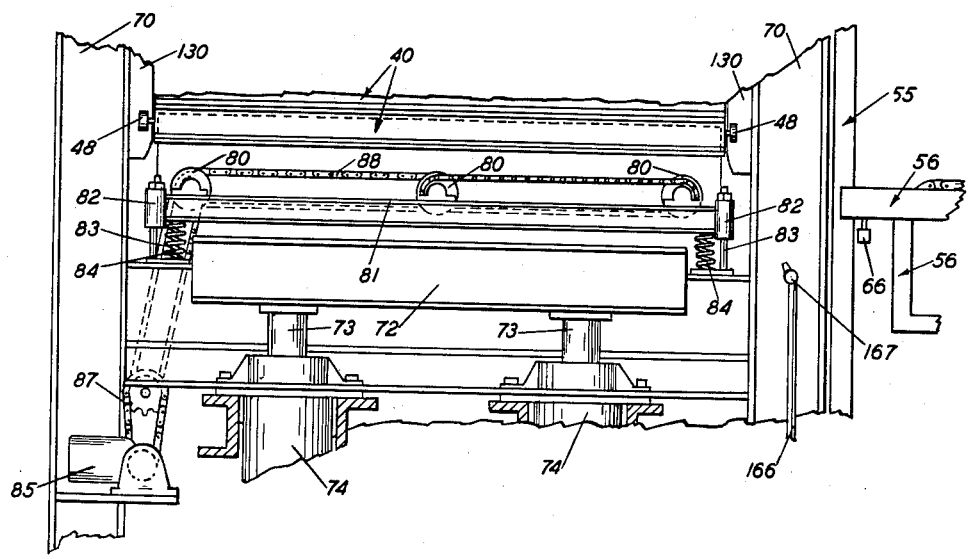
FIG. 5 is a partial vertical section, on an enlarged scale, taken substantially from the plane 5—5 of FIG. 3.

In order to maintain the stack of platens vertical while in the press, a guide bar 130 (see FIG. 5) is fixed to each of the upright H-beams 70. The rollers 48 on the ends of the platens bear against the lateral surfaces of the guide bars and the corners of the platens bear against the longitudinal surfaces of the guide bars to maintain the stack in vertical alignment. The lower ends of the guide bars are beveled on both guiding surfaces as seen in FIGS. 3 and 5 whereby slight irregularities of alignment of the incoming platen are corrected prior to initial compacting of the material. The guide bars terminate at their upper ends below the level to which the released platen is lifted by the lifter arms 120, as seen in FIG. 4.

Heating means are provided in the press, as follows: In FIG. 3 there is indicated a source of heated gas, such as air or other relatively inert gas, comprising a supply duct 132 leading from any suitable furnace or heat exchanger (not shown). A blower 133 takes the hot gas from duct 132 and forces it through a duct 134 into a plenum chamber 135 adjacent the top of the stack. The plenum chamber extends transversely of the stack and has a pair of horizontal branches 136 extending longitudinally of the stack, one on each side. A plurality of tapering, telescoping conduits 137 depend from each of the branches 136, each of the conduits comprising a plurality of telescoping sections 138 of successively diminishing diameter. Those sections near the bottom of the conduit are shorter than those approaching the tops of the conduits. Each section comprises an outlet nozzle 139 which is directed transversely of the press. The sections are maintained in adjusted telescoping relation with respect to each other by supporting bars 141 extending longitudinally of the sides of the press. The ends of the bars 141 are fixed to traveling rings 142 embracing vertical, threaded support rods 143, each ring being held in adjusted position by nuts 144 threaded onto the rod. Individual adjustment of the relative spacing of the bars 141, and therefore of the vertical spacing of the nozzles 139, may be thus accomplished. As seen in FIG. 10 the nozzles are directed toward the platens, and each nozzle is directed axially of one of the passages 44 through the platens, the relative positions referred to being when the platens are stationary, which is most of the time that they are in the stack. The adjustment vertically of the nozzles may be required in order to accommodate different thicknesses of jibs on the platens to produce different thicknesses of finished product. Preferably, there is a plurality of nozzles closely spaced together at the bottom of the stack so that each platen receives a blast of hot gas for a longer period of time immediately following its entry into the stack. The upper nozzles may be more widely spaced because less heat is needed as the material becomes drier. A plurality of similar telescoping sections 145 may project above each branch 136, the arrangement being merely a continuation of the lower heating means. These sections carry similar nozzles 146, as illustrated. As seen in FIG. 9, the nozzles on one side of the press are preferably arranged opposite every other passage 44, and the nozzles 139 on the other side of the press are arranged opposite the intervening passages. Therefore, the platen is uniformly heated throughout, as distinguished from the result which would be achieved if the hot gas entered one side only.

The conduits 137 and the branches 136 are disposed within a chamber 150 extending across the side of the stack-press between the upright beams 70, a portion of the wall thereof being defined by an insulated panel 151. The end walls of the chambers 150 are provided by overlapping plates 152 carried by the bars 141. The chambers 150 are connected at the upper outer corners to vertical outlet ducts 153 which extend above the posts 70, the upper ends thereof opening into a collecting chamber 154. A duct 155 leading from the collecting chamber provides the inlet for a second blower 156 which discharges the exhaust gases into a return duct 157 leading back to the furnace or heat exchanger. The end walls of the stack-press between the chambers 150 are enclosed by insulated panels 158, in effect creating an insulated stack through which the hot gas is circulated with minimum heat loss. The blowers 133 and 156 are operated so as to create a slight positive pressure in the plenum chamber 135 and a slight negative pressure in the collecting chamber 154, thereby permitting constant, uniform flow through the nozzles 139 and controllable heating of the platens and the material therebetween. The gas is heated to a temperature in the range of 800° F. to 900° F., which causes the platens to be heated to a temperature in the range of 300° F. to 375° F., whereby the material is subjected to temperature above the boiling point of water but below the charring point of cellulose, for a period of time in the range of one-half to one and one-half hours, depending upon the variable factors noted above.

When the free platen is raised by the lifting arms 120, a switch 160 (FIG. 4) is thereby closed, which switch is in series with a switch 161 mounted on the elevator frame 55 and which is closed by engagement with the elevator 56 when it is in raised position. When both switches are closed, an ejecting conveyor motor 162 mounted on the top of the upper ram deck 76 is energized. This motor drives a pair of ejecting chains 163 which extend about sprockets 164, mounted at the ends of the ram deck 76, and are guided longitudinally above and below the channel bar 125 (FIG. 6). Drive connection between the motor 162 and the chain 163 is achieved through a sprocket chain drive 165. Each chain 163 carries a pair of projecting lugs 166 which normally rest in the position illustrated in FIG. 4. The lugs are spaced half the length of the chain apart, and each actuation of the motor 162 is automatically timed to advance the chain one-half of its length. One of the pairs of lugs 166 engages the rear end of the free platen and ejects it from the stack-press, the platen rolling on the rollers 127. As the platen leaves the press it is received by the elevator rollers 59 and advanced onto the elevator deck, the motor 61 having been energized by interlocking controls, including the switches 160 and 161. The controls are such that the motor 61 stops when the platen is fully upon the elevator deck, and thereupon the elevator is lowered to its lowermost position where the caul-plate carrying the consolidated board is ejected into the tempering and stacking mechanism and the platen returned to the bottom of the press while still hot and bearing a new caul-plate and an unconsolidated mat of material. As the platen rolls into the hot-press, a suitable control (not shown) engaged thereby opens a source of fluid under pressure indicated by the pipe 166 (FIG. 5) whereby a suitable parting compound, such as a paraffin emulsion, may be sprayed through a bank of spray heads 167 onto the lower surface of the caul-plate 46 attached to the bottom of the platen.

*Outgoing Conveyor*

The caul-plate 47 bearing the finished board 53 is ejected into the outgoing conveyor system detailed in FIGS. 15 to 18 inclusive, and generally designated by the numeral 13. The leading edge of the caul-plate 47 strikes an inclined ramp 170 at the adjacent edge of a frame 171 whereby the caul-plate is definitely lifted onto a plurality of live rolls 172 mounted in the frame. The live rolls are normally rotating, being driven by an electric motor 173, a sprocket drive 174 from the motor to a pulley shaft 175, and belt-driving means 176 from the pulley shaft to the individual pulleys coaxially affixed to the live rolls 172. The live rolls advance the caul-plate and finished board until the switch actuator 65 is engaged to close a switch 180 mounted on the frame, which stops the motor 173. A pair of pressure rolls 181 are mounted above the first live roll 172 in order to increase friction between the caul-plate and the first live roll so as to assure complete removal of the board from the vicinity of the elevator. The switch 180 energizes a piston 182 and cylinder 183 mounted above the live rolls on a suitable extension of the frame 171. The piston 182 is connected to a double arm crank 184 pivotally mounted on a bracket 185, the opposite ends of which are pivotally connected to oppositely extending links 186. Each link is pivotally connected at its outer end to an upwardly extending crank arm 187 fixed to a rock shaft 188. Each rock shaft has a pair of arms 189 fixed to the ends thereof, each of which supports a lifter arm 190 terminating in an inwardly facing, corrugated shoe 191, the shoes normally resting beyond the end edges of the advancing board 53. The upper end of lifter arm 190 is urged toward the upper end of crank arm 189 by a tension spring 192, such movement being limited by an adjustable stop 193. When the spring 192 is extended, the shoes 191 engage the end edges of the board 53 and raise the board above the caul-plate 47. The springs 192 allow the shoes to accommodate irregularities in the edges of the board.

The switch 180 also actuates a motor (not shown) to drive a pair of caul-plate removing conveyor chains 195 having spaced lugs 196 thereon which engage the end edge of the caul-plate 47 and convey it away to be cleaned by suitable mechanism (not shown) and returned to the means for forming the mat and delivering the caul-plate and mat to the press, as previously described. The caul-plate 47 may be suitably treated in passage, such as by means of spray heads 197 (see FIG. 1) which deliver steam, parting compounds, or the like, to the caul-plate, a suitable source of such material under pressure being indicated by the tank 198. The time delay reverses the piston 182 when the caul-plate has been removed, whereby the board is dropped back onto the live rolls 172.

The switch actuator 65 and the switch 180 are mounted upon a rocker arm 200 pivoted to the frame, and held in a normal position, such as illustrated in FIG. 15, by a spring 201 so as to project into the path of the caul-plate and board, as previously described. The time delay relay energizes at the suitable moment a solenoid 202 which is connected to the upper end of arm 200 through an over-running linkage 203, and at the same time re-energizes the motor 173 to start the live rolls 172. This advances the forward edge of the board across the top of the arm 200, and the board holds it depressed in spite of de-activation of the solenoid 202 until the trailing end of the board has advanced beyond the arm.

*The Tempering and Stacking Mechanism*

Figure 21:
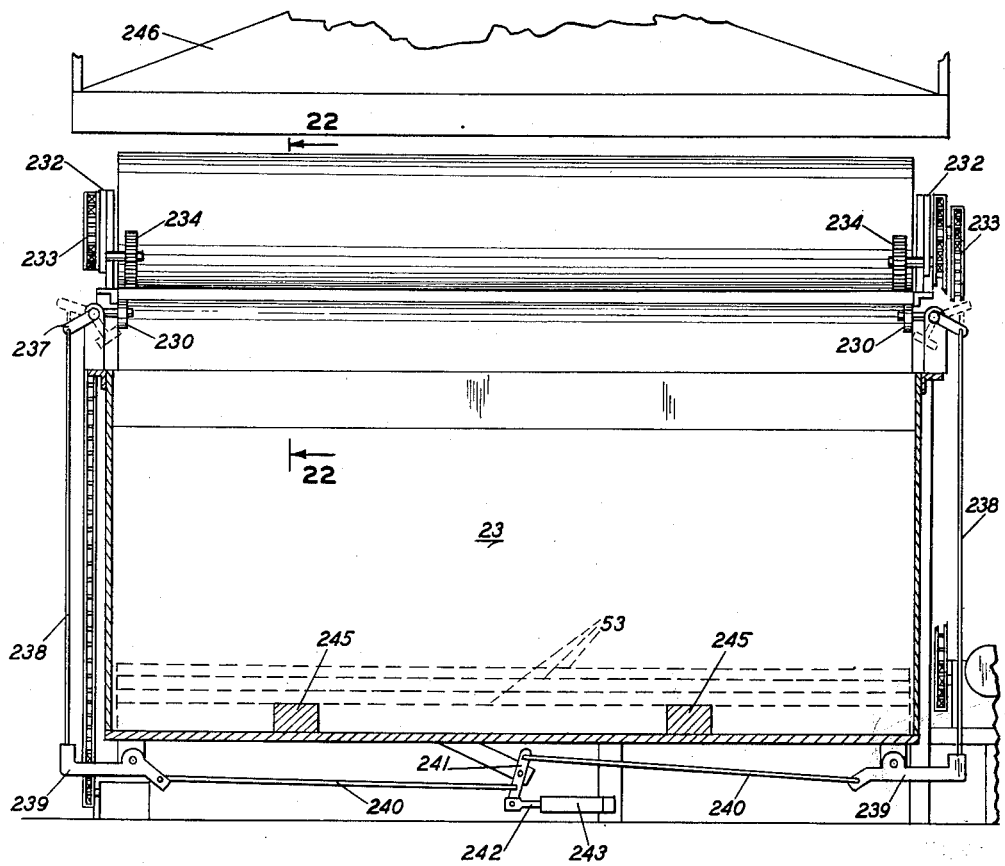
FIG. 21 is a vertical section taken substantially along line 21—21 of FIG. 19.
Figure 22:
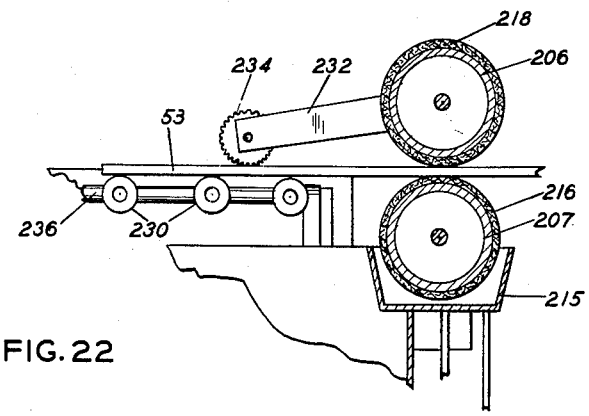
FIG. 22 is a vertical section taken substantially along line 22—22 of FIG. 21.

The tempering and stacking mechanism 14 is more fully detailed in FIGS. 19 to 21 inclusive. In FIG. 19 it is seen that the board progresses over an idle roll 205 into the nip of a pair of tempering oil applying rolls 206 and 207. The lower roll 207 is driven by an electric motor 208 and a sprocket chain drive 209 so as to be constantly rotating in the direction to advance the board. The shaft of roll 207 supports a sprocket 210 which engages an intermediate portion of one flight of a vertically disposed sprocket chain 211. The sprocket chain 211 is passed about a sprocket 220 which is mounted upon a stub shaft 221. The chain 211 drives a sprocket 212 connected to the shaft of the upper roll 206 to drive it in the direction to advance the board. The lower roll 207 rotates within a trough 215 in which a suitable tempering oil, or other desired liquid, is disposed, and is provided with a soft, porous sheath 216 (FIG. 22) whereby the liquid is transferred to the lower surface of the board. The shaft of the upper roll 206 is guided in vertical guide slots 217 whereby the roll 206 normally rests on the surface of roll 207 but may be raised to accommodate the intervening board. Roll 206 is provided with a similar sheath 218 which normally rotates in contact with the sheath 216 whereby the sheath 218 becomes saturated with the fluid during the periods between delivery of successive boards thereto. A sprocket 222 on the shaft of roll 207 drives a sprocket chain drive 223 which operates a pump 224. The pump 224 draws fluid from a container 225 through a suction pipe 226 and forces it through a discharge pipe 227 into the trough 215. Excess fluid is returned to the container through an outlet pipe 228. The container may thus be opened to permit replenishing of the supply, as needed.

As the boards leave the nip of the rolls, the edges thereof are supported upon a plurality of idle rollers 230 mounted at the opposite ends of a three-sided bin 231 which is open at the side away from the tempering rolls. A pair of arms 232 extending forwardly from the ends of the roll 206 support sprocket drives 233 which drive ribbed rolls 234 positioned above the last pair of idle rollers 230. The sprocket drives 233 are driven by the roll 206 whereby the rolls 234 are positively driven to advance the board after it clears the nip of the tempering rolls. The stub shafts upon which the rollers 230 are mounted project from a pair of rock shafts 236 mounted above the sides of the bin, each of which is connected to a crank 237. Each crank is connected to a link 238 which is connected to one arm of a double arm crank 239 mounted beneath the bin. The other arms of the cranks 239 are connected by links 240 to a double armed crank 241 mounted beneath the center of the bin. The crank 241 may be rocked by a piston 242 and cylinder 243 under control of a switch 244 engaged by the leading edge of the board after it clears the tempering rolls. The idle rolls 230 are thereby rocked downwardly and outwardly beyond the edges of the board, as shown in dash line in FIG. 21, thereby permitting the board to drop into the bin. Preferably, a pair of blocks 245 are placed in the bottom of the bin whereby a fork lift truck may be utilized to remove stacks of boards from time to time. A hood 246 extending over the tempering rolls and the bin is connected to suitable exhaust blower means (not shown) whereby oil vapors or the like may be safely ejected from the plant.

It is to be appreciated that portions of the foregoing apparatus may be altered or modified without changing the character of the invention herein disclosed. All such modifications and alterations as come within the true spirit and scope of the following claims are considered to be a part of my invention.

I claim:

1. A hot press for fabricating artificial boards from preformed mats of board-making constituents capable of being consolidated under heat and pressure with attendant release of steam comprising an upright press frame, a plurality of separate platens each comprising means providing an upper plane surface and a lower plane, steam-impervious surface fixedly held in spaced-apart, parallel relation to each other with open spaces therebetween for the passage of a heating medium, a plurality of separate caul plates having steam-impervious surfaces and each of a size to support a preformed mat of board-making constituents and to rest upon one of said upper platen surfaces entirely within the boundaries thereof, said frame being adapted for holding a stack of alternately superimposed platens and caul plates with mats of board-making constituents therebetween in progressive stages of consolidation, steam-impervious surfaces of said platens and caul plates being directly in contact with the board-making constituents and steam escape from said constituents being permitted only at the edges of the mats of board-making constituents, means to maintain said stack under pressure within said frame, means within said frame for directing heating medium through said open spaces of said platens, and means to progress said stack through said frame by successively adding platens each bearing a caul plate and mat to the bottom of the stack and removing platens each bearing a caul plate and a consolidated board from the top of the stack, the space between adjacent platens being open to atmosphere throughout the entire path of travel of said platens from the bottom to the top of the press for permitting steam escape.

2. A hot press for fabricating artificial boards from preformed mats of board-making constituents capable of being consolidated under heat and pressure comprising an upright press frame, a plurality of separate platens each comprising means providing an upper plane surface and a lower plane surface fixedly held in spaced-apart, parallel relation to each other with open-ended spaces therebetween, a plurality of separate caul plates each of a size to support a preformed mat of board-making constituents and to rest upon one of said upper platen surfaces entirely within the boundaries thereof, said frame being adapted for holding a stack of alternately superimposed platens and caul plates with board-making constituents therebetween in progressive stages of consolidation, means to maintain said stack under pressure within said frame, nozzle means arranged adjacent the path of travel of said platens for directing a heating medium into said spaces between said platen surfaces, and means to progress said stack through said frame by successively adding platens each bearing a caul plate and mat to the bottom of the stack and removing platens each bearing a caul plate and a consolidated board from the top of the stack, said progressing means comprising means to shuttle the uppermost platen from the top of the stack back to the bottom of the stack while still hot and including means to remove the caul plate and consolidated board therefrom and replace the same with another caul plate bearing an unconsolidated mat.

3. Apparatus for consolidating a mat of board-making constituents into board products comprising a plurality of platens, each of said platens comprising means providing a pair of flat surfaces held in spaced-apart, parallel relation to each other with open-ended spaces therebetween, means for maintaining a stack of such platens in superimposed relation with preformed layers of board-making constituents sandwiched therebetween under pressure, nozzle means mounted adjacent the path of travel of said platens for projecting a heating medium through said spaces between the flat surfaces of said platens for heating the platens in said stack and the board-making constituents therebetween, and means for successively adding a platen and a layer of board-making constituents thereon to the bottom of the stack and releasing a platen with a consolidated board thereon from the top of the stack.

4. Apparatus for consolidating a mat of board-making constituents into board products comprising a plurality of platens, each of said platens comprising a pair of platen plates held in spaced-apart, parallel relation to each other with open-ended spaces therebetween, frame means for guiding a stack of such platens in superimposed relation with board-making constituents sandwiched therebetween, nozzle means arranged adjacent the path of travel of said platens aimed at the open ends of said spaces between the platen plates for projecting into such spaces a heating medium for heating the platens in said stack whereby to heat the board-making constituents therebetween, means for successively adding a platen and a layer of board-making constituents thereon to the bottom of the stack and releasing a platen with a consolidated board thereon from the top of the stack, and means for rapidly removing the board product from the released platen, replacing the same with a layer of board-making constituents and then presenting said platen and layer thereon to said means for adding a platen and layer thereon to the bottom of the stack whereby said platen is returned to the stack while still hot.

5. For use in an apparatus for consolidating mats of board-making constituents into artificial board products comprising a plurality of separate platens arranged for step-by-step movement in the vertical direction and nozzle means arranged along the path of travel of said platens and spaced from the edges of said platens for directing a heating medium through said platens, the invention comprising a platen structure comprising an upper flat-surfaced imperforate plate, a lower flat-surfaced imperforate plate and spacer ribs rigidly connecting said plates together in spaced-apart, parallel relation, said spacer ribs defining a plurality of open-ended passages throughout said platens whereby heating gas may be blown therethrough in contact with the inner surfaces of said plates through said nozzle means arranged adjacent to but spaced from the ends of said passages.

6. Means for consolidating board-making constituents into board products comprising a plurality of separate unitary platens, each of said platens having open-ended passages therethrough throughout their extent, means to superimpose a plurality of said platens with material to be consolidated between each adjacent pair of platens to form a stack, and blower means for blowing a hot gas through the passages in a plurality of said platens while in said stack, said blower means comprising a plurality of vertically disposed conduits, each of said conduits having a plurality of nozzles projecting into alignment with and terminating close to the ends of certain of said passages, and means to adjust the relative spacing of said nozzles with respect to each other in each of said conduits.

7. Apparatus for consolidating board-making constituents into board products comprising a plurality of separate platens between which layers of such constituents are interposed, said platens and layers being arranged in a vertical stack, each of said platens comprising a plurality of passages extending entirely therethrough from one edge to the opposite edge in parallel relation to each other, and means to heat the platens including a pair of nozzle banks each comprising a plurality of horizontal rows of nozzles, each terminating adjacent an end of one of said passages, there being one row of such nozzles adjacent one of said edges of a single platen with a nozzle arranged adjacent an end of alternate ones of said passages, and there being a second row of such nozzles adjacent the opposite one of said edges of said single platen with each one of said nozzles being directed toward the open end of corresponding intermediate passages.

8. A press for fabricating boardlike articles from relatively thick layers of board-forming constituents capable of being consolidated under heat and pressure with attendant release of steam, comprising a press, a plurality of metal platen means having steam-impervious surfaces, said press having a framework including a plurality of spaced apart vertical guides for guiding said platen means for movement in the vertical direction said platen means being adapted for arrangement alternatively with a plurality of said relatively thick layers in a vertical stack within said press, with each layer in contact throughout each of its broad surfaces with one of said steam-impervious surfaces, said press comprising means for applying pressure at all times vertically to said stack to an extent greater than that induced by gravity alone, means for heating said stack throughout to temperatures higher than the boiling point of water, and means for progressing each of said layers through said press from bottom to top thereof by successively removing individual platen means and treated layers from the top of the stack and inserting preheated individual platen means and fresh layers into the bottom of the stack, the spaces between said platens around the entire peripheries of said layers being in open communication with the atmosphere at least until the thickness of said layers is reduced to a predetermined final reduced thickness to permit free escape of steam from such peripheries, spaced apart spacer means arranged along edges of one surface of each of said platen means for restricting the closure of said platen means to said predetermined thickness.

9. A press for fabricating boardlike articles from preformed layers of board-forming constituents capable of being consolidated under heat and pressure with attendant release of steam, comprising a press, a plurality of metal platen means having steam-impervious surfaces with open-ended passage therebetween, said platen means being adapted for arrangement alternatively with a plurality of said layers in a vertical stack within said press, with each layer in contact throughout each of its broad surfaces with one of said steam-impervious surfaces and the peripheries of said layers being unconfined to permit free escape of steam therefrom to atmosphere, said press comprising means for applying pressure at all times vertically to said stack to an extent greater than that induced by gravity alone, nozzle means for projecting heating medium through said passages for heating said stack throughout to temperatures higher than the boiling point of water, and means for progressing each of said layers through said press from bottom to top thereof by successively removing individual platen means and treated layers from the top of the stack and inserting preheated individual platen means and fresh layers into the bottom of the stack, said nozzle means being arranged for delivering a greater quantity of heat to the bottom of the stack than to intermediate and upper portions of the stack.

10. Apparatus for consolidating board-making constituents into boards comprising a plurality of separate platens, said platens each comprising a plurality of partitions forming open-ended passages through said platens, frame means for guiding a stack of said platens superimposed upon each other with layers of board-making constituents sandwiched therebetween for movement in a vertical direction, means for removing the uppermost platen from said stack, means for shuttling said uppermost platen rapidly back to the bottom of said stack, and a plurality of means arranged adjacent the path of travel of and spaced slightly from the ends of said passages of the platens in the stack for projecting a heating medium therethrough, said means for projecting heating medium delivering a greater quantity of heat to the bottom of the stack than to upper regions of the stack.

11. Apparatus for consolidating board-making constituents into boards comprising a plurality of separate platens, said platens each comprising means forming a plurality of open-ended passages extending through said platens from side to side thereof, means for guiding a stack of said platens with layers of board-making constituents sandwiched therebetween for movement in the vertical direction, means successively to release the uppermost platen from said stack, means to shuttle said uppermost platen rapidly back to the bottom of said stack, nozzle means arranged adjacent the path of travel of the ends of said passages while in said stack for projecting a heating medium therethrough, means to remove a consolidated board from the platen being shuttled back, and means to place a fresh layer of board-making constituents on said platen prior to its insertion at the bottom of the stack, said nozzle means being arranged to deliver heating medium from opposite sides of said stack at a plurality of points along each side of an individual platen with the nozzle means at one side being staggered with respect to the nozzle means on the other side whereby a plurality of streams of heating medium pass between each other in opposite directions in adjacent passages within said platens.

References Cited in the file of this patent

UNITED STATES PATENTS

| | | |
|---|---|---|
| 263,540 | Landry | Aug. 29, 1882 |
| 1,574,175 | Schranz | Feb. 23, 1926 |
| 1,677,200 | Oakley | July 17, 1928 |
| 1,677,207 | Rett | July 17, 1928 |
| 1,780,280 | Stevens | Nov. 4, 1930 |
| 2,073,894 | Wood | Mar. 16, 1937 |
| 2,543,582 | Lyijynen | Feb. 27, 1951 |
| 2,704,736 | Greenberg | Mar. 22, 1955 |
| 2,765,587 | Skerritt | Oct. 9, 1956 |
| 2,775,787 | Krag | Jan. 1, 1957 |
| 2,854,896 | Marton | Oct. 7, 1958 |
| 2,909,804 | Means | Oct. 27, 1959 |
| 3,061,878 | Chapman | Nov. 6, 1962 |

FOREIGN PATENTS

| | | |
|---|---|---|
| 423,826 | Germany | Jan. 14, 1926 |
| 554,244 | Italy | Jan. 9, 1957 |
| 109,975 | Sweden | Mar. 7, 1944 |